US 9,152,226 B2

(12) United States Patent
Forutanpour et al.

(10) Patent No.: US 9,152,226 B2
(45) Date of Patent: Oct. 6, 2015

(54) INPUT METHOD DESIGNED FOR AUGMENTED REALITY GOGGLES

(75) Inventors: Babak Forutanpour, Carlsbad, CA (US); Shivakumar Balasubramanyam, San Diego, CA (US); Liberty Edward Mann, IV, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 607 days.

(21) Appl. No.: 13/525,102

(22) Filed: Jun. 15, 2012

(65) Prior Publication Data
US 2013/0335573 A1 Dec. 19, 2013

(51) Int. Cl.
*H04N 7/18* (2006.01)
*G06F 3/01* (2006.01)

(52) U.S. Cl.
CPC .................................. *G06F 3/011* (2013.01)

(58) Field of Classification Search
USPC ..................................................... 348/41–161
See application file for complete search history.

(56) References Cited

U.S. PATENT DOCUMENTS

| | | | | |
|---|---|---|---|---|
| 6,166,830 | A * | 12/2000 | Koh et al. ...................... 358/473 |
| 6,279,946 | B1 * | 8/2001 | Johnson et al. ................ 280/735 |
| 6,847,336 | B1 * | 1/2005 | Lemelson et al. ................ 345/8 |
| 2002/0091991 | A1 * | 7/2002 | Castro ........................... 717/106 |
| 2004/0163289 | A1 * | 8/2004 | Pearson .......................... 40/584 |
| 2010/0045612 | A1 * | 2/2010 | Molne ............................ 345/173 |
| 2010/0149073 | A1 * | 6/2010 | Chaum et al. ...................... 345/8 |
| 2010/0220037 | A1 * | 9/2010 | Sako et al. .......................... 345/8 |
| 2010/0302210 | A1 * | 12/2010 | Han et al. ....................... 345/175 |
| 2011/0231757 | A1 * | 9/2011 | Haddick et al. ............... 715/702 |
| 2012/0075168 | A1 * | 3/2012 | Osterhout et al. ................. 345/8 |

FOREIGN PATENT DOCUMENTS

| | | |
|---|---|---|
| CN | 2596380 Y | 12/2003 |
| JP | 2004313213 A | 11/2004 |

OTHER PUBLICATIONS

International Search Report and Written Opinion—PCT/US2013/042250—ISA/EPO—Sep. 23, 2013.

* cited by examiner

*Primary Examiner* — Joseph Ustaris
*Assistant Examiner* — Talha Nawaz
(74) *Attorney, Agent, or Firm* — Kilpatrick Townsend Stockton LLP

(57) ABSTRACT

Apparatuses, methods, systems and computer-readable media for using proximity inputs on or near a touch screen lens to select objects within a field of view are presented. In some embodiments, a viewing apparatus (e.g. head mounted display, augmented reality goggles) may include at least one lens, wherein the lens can sense touches or near-touches and output data indicative of a location of the proximity input by the user. A processor may receive the data and may select an object within the field of view of the user corresponding to the data, wherein the object and the location of the proximity input on or near the lens by the user are on a common line of sight. In some embodiments, the viewing apparatus may include at least one camera that is configured to record at least one image representative of the user's field of view.

39 Claims, 12 Drawing Sheets

INPUT METHOD DESIGNED FOR
AUGMENTED REALITY GOGGLES

BACKGROUND OF THE INVENTION

Virtual reality (VR) or augmented reality (AR) environments have been around for a number of years. VR or AR may refer to simulated environments featuring computer graphics that a user can interact with in a way that is more immersive than merely watching a television or computer screen. Past VR environments have included large pod-like or cockpit-like stations, where a user would sit down inside the station and be able to interact with a panoramic graphical interface that represented some 3-dimensional world. The user would typically utilize some external set of controllers, such as a joystick or interactive glove, in order to move around in the VR environment.

Other implementations of VR have included VR goggles, which are head-mounted devices that a user only needs to wear over her eyes. The user can then see the equivalent of a panoramic view that she could have seen in the immersive, pod-like stations, but the goggles enable the user to be more mobile and does not require such a large hardware implementation. The user may manipulate the environment seen through the goggles by using some external device, like a joystick or some other controller.

AR implementations attempt to blend computer graphics and other images with a user's actual surroundings, such that the user may perceive that his surroundings have been augmented. To achieve this, AR goggles that the user may wear typically provide transparent or substantially transparent lenses, so that the user can still see his actual surroundings while viewing other objects at the same time. Companies such as Lumus Ltd. have developed technologies that can project light images into a user's pupils while still enabling the user to view his surroundings. Technologies in AR have promise to greatly enhance a user's living experience. It is therefore desirable to create systems and methods that improve AR technology.

SUMMARY OF THE INVENTION

Apparatuses, methods, systems and computer-readable media for using proximity inputs on or near a transparent touch screen lens to select objects within a field of view are presented. While some current viewing apparatuses (e.g. head mounted displays, augmented reality goggles) allow users to see graphics overlaid within the user's field of view, instructing these viewing apparatuses to display images or select objects in view currently requires some external device (e.g. a joystick or a mobile phone) connected to the viewing apparatus, encumbering the user and possibly making users feel too self-conscious to wear these readily. Additionally, current augmented reality goggles lack precision when identifying objects within a field of view. It is currently difficult to for a user to identify or select a smaller, detailed object within the field of view due to this lack of precision.

By implementing aspects of the disclosure, however, the user may instruct the viewing apparatus simply by touching the lenses or hovering near the lenses of the viewing apparatus, reducing reliance on an external input device. The viewing apparatus may also include a zooming feature that magnifies a field of view, allowing the user to more easily view and/or select a smaller, detailed object.

In some embodiments, a viewing apparatus (e.g. head mounted display, augmented reality goggles) may include at least one lens, wherein the lens can sense touches and output touch data indicative of a location of a touch on the lens by the user. A processor may be included in the viewing apparatus, wherein the processor may receive the touch data or other data indicative of the touch data, and may select an object within the field of view of the user corresponding to the touch data, wherein the object and the location of the touch on the lens by the user are on a common line of sight of the user.

In some embodiments, the viewing apparatus may include means for detecting a near-touch input that is substantially close to the lens but does not touch the lens. The viewing apparatus may be configured to select an object within the field of view based on the near-touch input, and/or perform at least one operation in response to the near-touch input.

In some embodiments, the viewing apparatus may include at least one camera that is configured to record at least one image representative of the user's field of view. For example, a camera may be positioned on the front of augmented reality goggles and may be configured to record a panoramic picture that corresponds to the wide field of view that a user naturally sees. In another example, there may be two cameras, each positioned above one of two lenses that takes pictures representative of what each eye of a user may see.

In some embodiments, the processor of the viewing apparatus may be further configured to receive an image from the camera, identify a location on the image that is mapped to the location of the touch by the user on the at least one lens, and then select the object within the user's field of view corresponding to the location of the touch on the lens and also the location in the image mapped to the location of the touch on the lens. For example, the processor may receive a digital image from the camera, comprised of a rectangular matrix of digital pixels. The processor may calculate a coordinate position (e.g. (x, y)) of the touch by the user on the lens, and map that coordinate position to a coordinate position in the digital image from the camera that corresponds to a pre-calibrated mapped location of pixels of the image (e.g. (x', y')). The processor may then select the object within the image that corresponds to that location of pixels (x', y').

In some embodiments, at least one camera may further comprise a zooming function that is configured to magnify the field of view. For example, a particular pattern of touches on the lens or holding a finger in contact with the lens may command a camera to perform the zooming function to magnify the field of view (which may include, for example, a dog wearing a collar) and display the magnified field on the lens. The user may then touch the lens again, wherein the camera may then record an image of the magnified viewing location that focuses on a smaller object in the field of view (e.g. the collar). The processor may then receive the image or some data based on the image and select an object within the magnified field of view that corresponds to the location of the user's touch and to where that touch location is mapped to in the magnified image.

In some embodiments, the viewing apparatus may further comprise an image projection module configured to project visual information on the inside of the least one lens, wherein the visual information is based on the selected object. For example, a pair of augmented reality goggles may include tiny pico-projectors that shoot images onto the inside of the lens. The images may be circles that highlight the selected object according to the location of the touch by the user, or they may be text that conveys information about the selected object.

In some embodiments, the viewing apparatus may further comprise at least two lenses, wherein the image projection module may be further configured to display visual information of a selected object based further on which lens is touched (e.g. (x, y, 1)). For example, if the user touches a location on the left lens that corresponds to a person within the user's line of sight and the touch, then the processor may attempt to identify the person, and the image projection module may display the selected person's Facebook profile. On the other hand, if the right lens was touched, only a circle may display over the selected person. In some embodiments, touching one of the lenses corresponds to an information display function, for example causing the pico-projector to display an identity of a selected individual, while touching the other lens corresponds to an action, for example calling the selected individual. Such action may include, for example, transmission of information to another device such as a phone.

In some embodiments, the at least one lens may be further configured to sense an amount of pressure of the touch on the at least one lens, and the processor may be further configured to instruct the image projection module to display information based further on the amount of pressure (e.g. (x, y, p)). For example, a size of a selection area may depend on a pressure exerted on the lens. In one embodiment, a light touch selects a pinpoint area, while a firm touch selects the area and a surrounding penumbra.

In some embodiments, one or more of the above inputs may be combined or jointly used to affect operation of a system. For example, a touch input may be passed to an AR application as a tuple comprising (x, y, l, p).

In some embodiments, the camera is omitted or unused when a touch input is received. For example, touching a lower corner of a lens may cause information regarding the nearest building or restaurant to be displayed, where the nearest building or restaurant is determined using an SPS, triangulation, trilateration, or some other method not requiring an input image.

In some embodiments where the camera is used, a touch may be used to identify an area or object in an image being captured by the camera at the time the touch is performed. In other embodiments, the camera may be activated only after a touch is received, thereby reducing power consumption.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Methods and apparatuses are provided for selecting objects within a field of view using transparent touch screen lenses. The disclosure may refer to a "lens" or "lenses," terms which encompass broadly any type of transparent or semi-transparent pane, sheet or film made up of at least one type of material. It is not necessary for the lens or lenses to provide any optical correction or change. Moreover, the terms "lens" and "lenses" may include more than a single pane, sheet or film, including combinations therein pressed or stacked together. A lens may be constructed out of multiple pieces of material, such as glass and microscopic circuits, and is not limited by any composition. A lens may be comprised of a single piece of glass, for example, or may comprise a transparent capacitive touch screen with microscopic sensors embedded within it. Alternatively, a lens may be a single piece of glass with a capacitive film attached to the glass. Also, the methods and apparatuses may refer to "touch data," which is generally defined as information derived from a user's touch on an apparatus. Such touch data could include the location of the touch on the apparatus, the degree of pressure applied with the touch, the temperature of the touch, the speed of repetition between touches, and the like.

Embodiments may refer to a "near-touch" input, which may include an input derived from an object or appendage substantially close to a lens or lenses, but not actually touching the lens or lenses. In some embodiments, the "near-touch" input comprises a "hover." The distance of the object or appendage to the lens or lenses may vary, and embodiments are not so limited. Where embodiments refer to a "hover," the term "near-touch" may also be used. Similarly, a "hover" may be used in place of a "near-touch" in described embodiments.

Embodiments may refer to a "proximity input," which may include both touch data and hover or near-touch inputs as described herein. Proximity inputs may include data that is based on a combination of both touch data and near-touch inputs, or may refer to only one or the other.

Embodiments may refer to "operations," which may generally include computer-related processes that are performed by embodiments. "Operations" as described herein are distinguished from other related words as used herein, in that operations may refer to actions performed by embodiments or objects within embodiments, e.g. a viewing apparatus or a processor associated with a viewing apparatus, as opposed to actions performed by a user.

Figure 1:
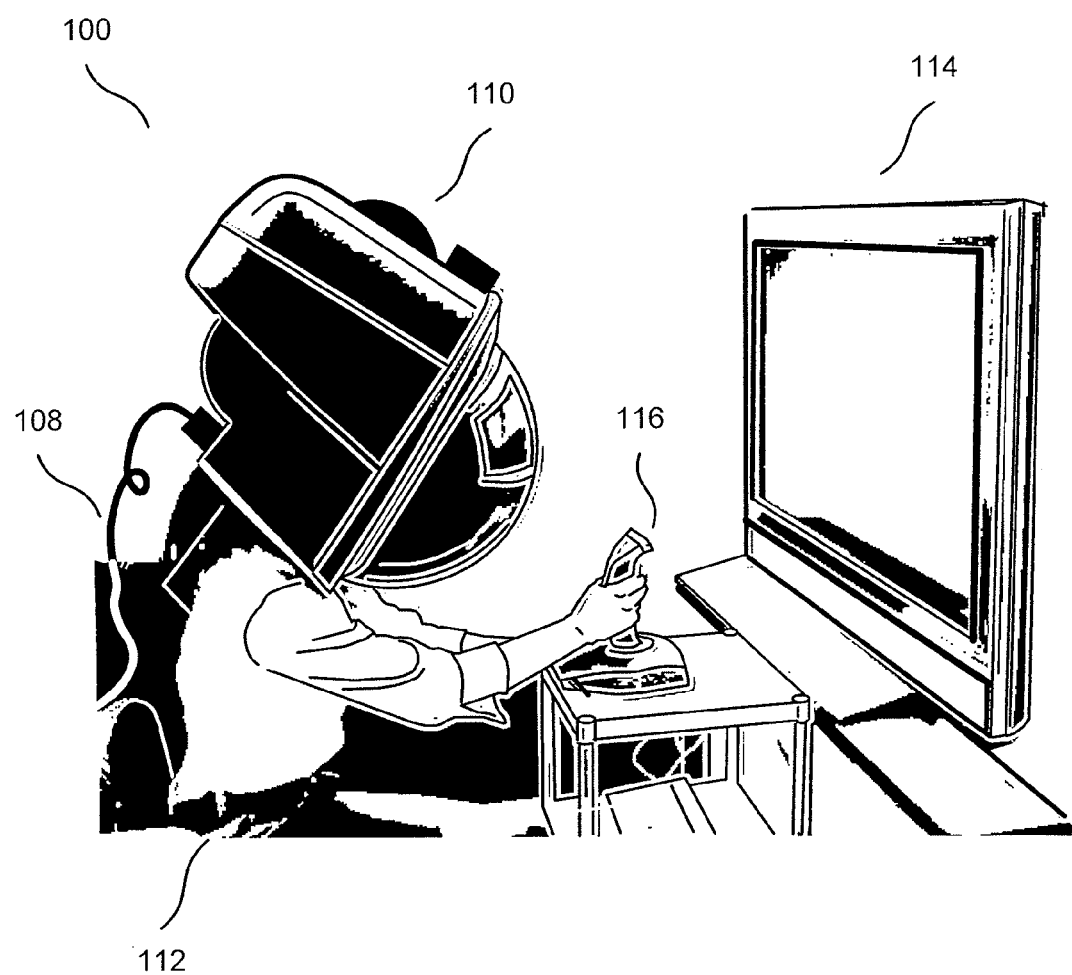
FIG. 1 is an example of implementing a virtual reality environment.

One advantage of certain embodiments described herein includes providing methods and apparatuses of virtual or augmented reality (AR) technology that are more intuitive and "user-friendly" to a user. FIG. 1 depicts an example of virtual reality (VR) equipment that has been in existence for quite some time. Head-mounted devices 110 have been a common type of VR equipment, where the initial focus of VR implementations was merely on the virtual environment functionality, more so than aesthetics or ease of use. A user 112 would encase herself in an environment having some viewing monitor 114 and a controller, like a joystick 116. These devices were required to enable a user 112 to interact with a VR environment 100. However, the VR functionality was clearly limited to the user 112 sitting in that one particular spot, because the head-mounted device 110 could not be used without the screen 114 and the joystick 116.

Aside from the requirement for the viewing screen 114 and joystick 116, one can imagine that a head-mounted apparatus 110 like the one shown in FIG. 1 would still be very difficult to walk with, let alone walk outside with and use daily. Such a device 110 may also have to be plugged into a power supply, requiring a cord 108 stuck to a stationary source, further limiting movement. Furthermore, the aesthetics of the look of the device 110 on a user's 112 head may be displeasing: many users may not want to be seen out in public wearing the device. The device 110 may appear bulky, and people may ridicule the user 112 for looking like an astronaut or some other oddity. While this setup 100 may achieve the functional purpose of simulating a virtual environment, this device 110 may be insufficient for certain mainstream uses, without improvements. When VR or AR technology is used in public in a mainstream way and not simply be for research purposes in a closed room, the apparatus designs may be aesthetically pleasing and enhance the user's living experience, not impede it.

Figure 2:
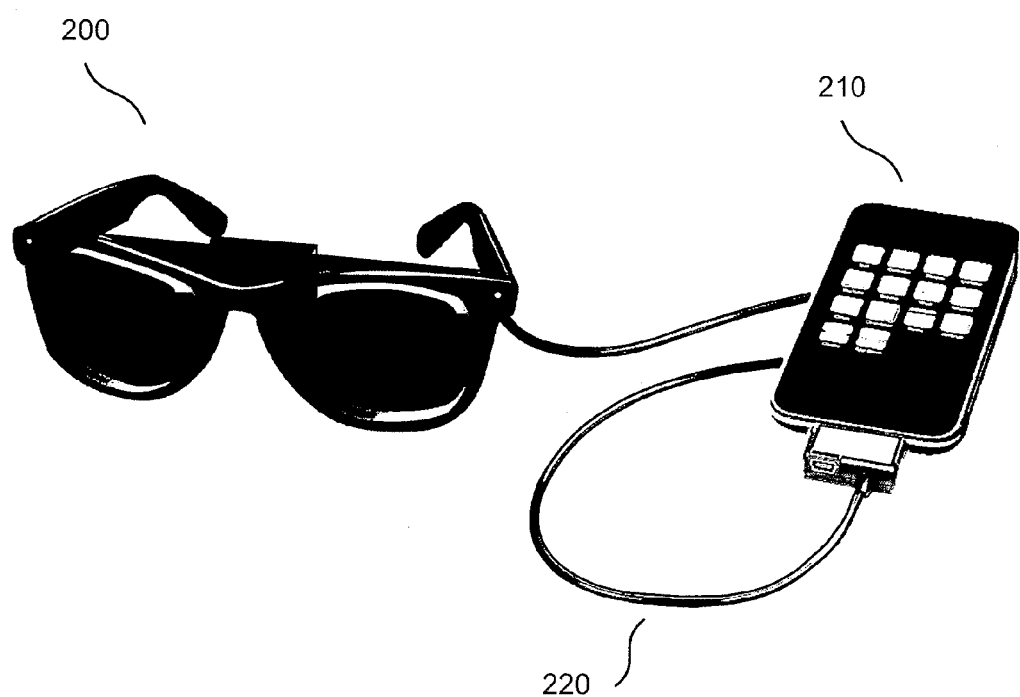
FIG. 2 is an exemplary implementation of virtual reality goggles, controlled by an external device.

Referring to FIG. 2, the example augmented reality glasses depicted may have improved drastically from those depicted in FIG. 1. Here, the AR viewing device 200 looks more like a typical pair of glasses, minimizing the social awkwardness that may arise from wearing a bulky headset 110. Glasses 200 may be desirable to wear out in public based on the aesthetic look and feel of the glasses. However, one problem with glasses 200 is that the AR or VR functionality is physically coupled to an external device, such as a cell phone 210. The cell phone 210 may act like a television remote control, where pushing buttons or icons on the phone will activate some sort of functionality in the glasses 200. In other cases, the cell phone 210 possesses gyroscopes, and can interact with the glasses 200 like a Nintendo WHO controller. Often, as depicted here, the cell phone 210 is connected via some wire 220 to the glasses 200. Thus, while the glasses 200 may look aesthetically pleasing, the entire apparatus or system may still be undesirable for some uses, for example due to the wires 220 hanging out of the viewing device 200, or simply due to the fact that an external device 210 is necessary to interface with the AR viewing apparatus 200. Another problem may be that the controls on the phone 210 may not be an "intuitive" implementation. A user may have to learn exactly which buttons to push, which could be entirely arbitrary and would require the user to memorize exactly what the buttons do before being comfortable with its use. It may therefore be desirable to implement a method for interfacing with an AR or VR environment that is self-contained within the device, having interfaces that are intuitive to the user in an aesthetically pleasing way.

Figure 3:
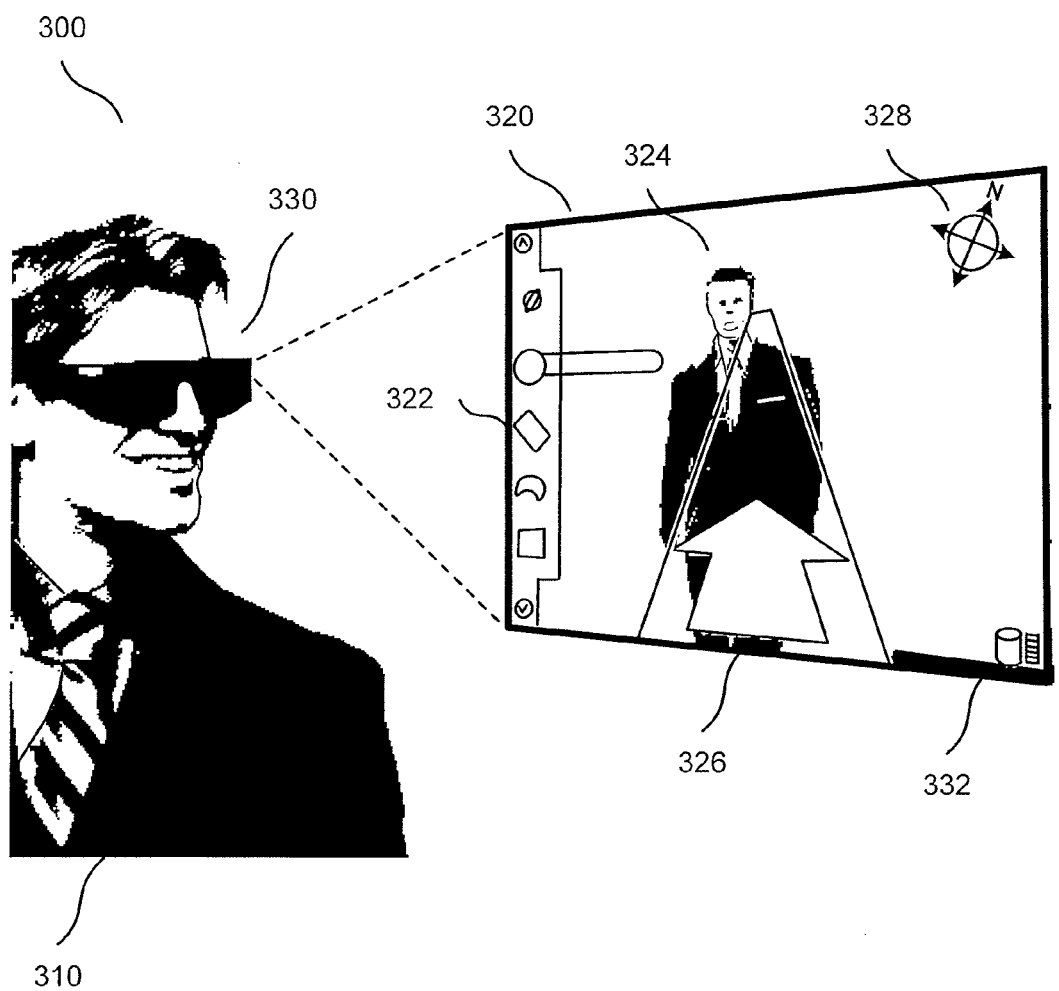
FIG. 3 is a graphical illustration of a virtual reality overlay from the viewpoint of a user.

FIG. 3 is an exemplary illustration 300 of what a user 310 may see in his field of view 320 when wearing various embodiments of the present invention. Here, the user 310 can see his normal surroundings, such as a man 324 walking down the street in his viewing window 320. However, with various embodiments, e.g. augmented reality equipment 330, additional menus 322 may also appear in the user's 310 field of view 320. Selecting these menus 322 can cause other applications or graphics to open up in the user's 310 field of view 320, not shown. The AR equipment 330 may provide additional information 326, such as a calculated distance between the user 310 and the man 324 in the user's 310 perceived focus. The user 310 may also be able to see other functions while wearing the augmented reality equipment 330, such as a compass bearing 328 or the viewing apparatus' battery life 332. These illustrations are merely examples and are not limiting on embodiments of the present invention. In some embodiments, form factors similar to those shown in FIGS. 1 and 2 may be utilized.

Figure 4:
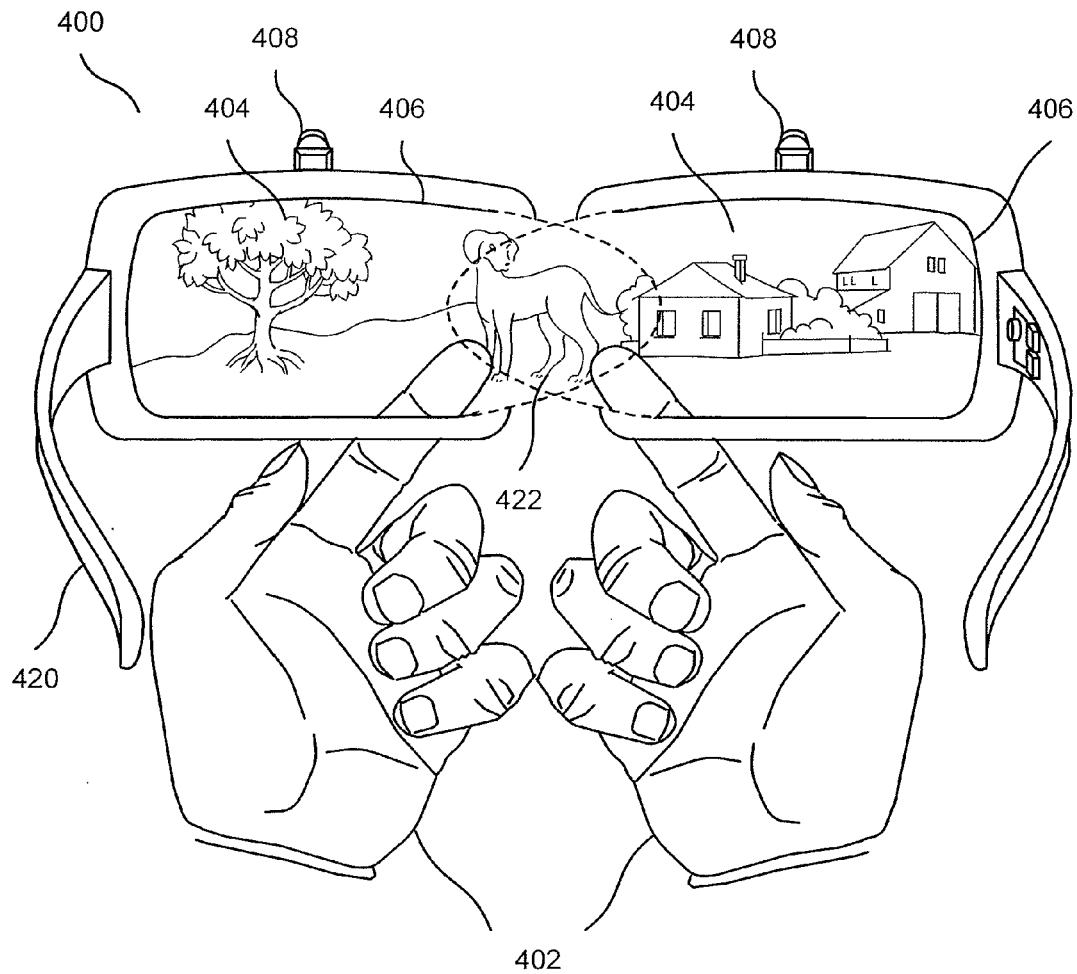
FIG. 4 is a graphical illustration of various embodiments, including a touch sensitive lens.

Referring to FIG. 4, the graphical illustration 400 represents various embodiments using touch lens features. To activate various functions, a user 402, able to perceive a field of view 404 through a viewing apparatus 420, may touch the front side of a lens 406 of the viewing apparatus 420. The lens 406 may be at least one transparent or semi-transparent pane, sheet or film, comprised of at least one type of material, and is not limited to it providing optical enhancements or the like. The lens 406, being touch sensitive and configured to output touch data, may then transmit the touch data derived from the user's touch to a processor, not shown. The processor may be built into the viewing apparatus or contained at a remote location. The processor may then receive the touch data or some substantial representation of said touch data and perform an operation based on the touch data or said substantial representation. Such operations may include selecting objects within the user's 402 field of view 404 and in accordance with the user's 402 line of sight. For example, the user 402 may touch the location on the lens 406 that corresponds with the user's 402 line of sight of the dog 422. Based on the touch, the viewing apparatus 420 may then perform the operation of selecting the location on the lens of the touch that corresponds with the line of sight of the dog 422. In some embodiments, elements other than the lens may determine when a user is touching the lens or where on the lens the user is touching, or may aid in such determinations. For example, certain of the elements described below to detect a near-touch or hover may be used in some implementations to perform or aid these determinations.

In some embodiments, cameras 408 are mounted or attached to the viewing apparatus 420 to increase functionality. The cameras 408 may be front facing cameras and capable of recording high resolution, panoramic images that represent the user's 402 entire field of view or substantially the entire field of view. In other embodiments, the cameras 408 may have a zoom and swivel functionality, whereby the cameras may be configured to follow a direction by the user 402, based on where he touches the lens or other means.

The cameras 408 may be configured to record images or video of the user's environment. Additional functionality of various embodiments of the present invention, not shown, may utilize this image data and perform additional functionality.

The cameras 408 may be placed in different areas of the viewing apparatus 420. Currently depicted in FIG. 4, the cameras 408 may be mounted on the top of the glasses 420. The cameras 408 could also be placed on the bottom, or on the sides near the ear pieces, for example. There may be only one camera 408, and that may be imbedded at the bridge of the glasses in the center, or just on one side of the glasses.

Embodiments of the present invention are not so limited by the placement of cameras 408, if any, and descriptions herein are merely illustrative.

Figure 5:
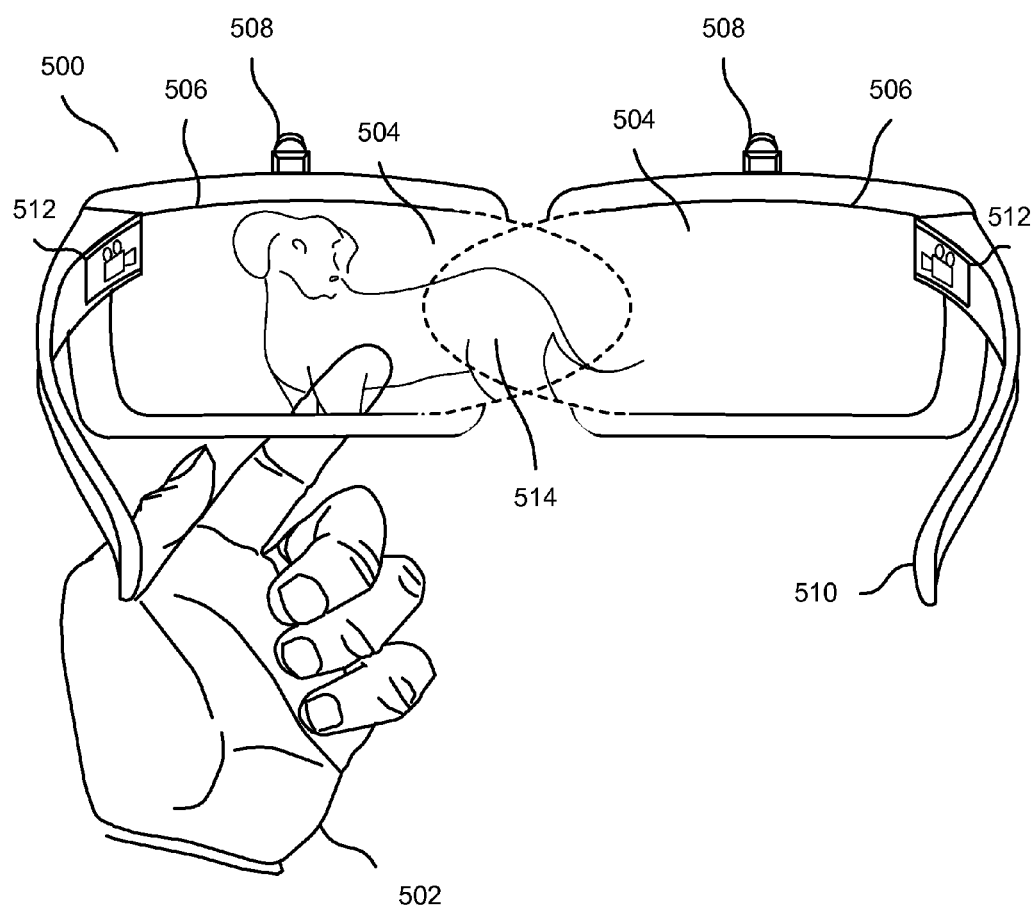
FIG. 5 is a graphical illustration of other various embodiments, including a zooming feature.

Referring to FIG. 5, the graphical illustration 500 shows a zooming display functionality of various embodiments. Certain objects in the user's 502 field of view 504 may be difficult to select by a mere touch of the user's 502 finger onto the lens 506. For example, the user 502 may want to select the ears or nose of the dog 422 in FIG. 4, but is unable to obtain such precision given how small the dog 422 appears. A zooming functionality may help alleviate this problem. Here, cameras 508 may have a zooming capability. When instructed, cameras 508 may zoom in and record an image of the field of view that contains the dog 422. The viewing apparatus 510 may also include mini light projectors 512 that are capable of displaying images onto the inside of the lenses or reflecting images into the pupils of the user, thereby making it look like images are reflected onto the lenses. The light projectors 512 may be instructed to display the zoomed image of the dog 514, captured by the cameras 508. Then, the user 502 will be able to touch the location of the lens that corresponds to the zoomed portion of the dog 514 that he wants to select, thereby signaling to the viewing apparatus that he wants to select the dog's 514 ears, for example.

Alternatively, the cameras 508 may be capable of recording a high resolution image while being positioned in a fixed, front facing orientation. Similar to high resolution images appearing magnified when displayed on a lower resolution computer monitor (e.g. a 1600×1600 pixel resolution image on a computer screen with 1280×960 pixel resolution appears much larger than originally recorded), here, the light projectors 512 may display all of the pixels in the captured high resolution image onto the lenses 506, which may display graphics on a lower level of resolution, thereby making it appear as if the image 514 is magnified. Light projectors 512 may be able to display other images as well, like an image of the dog 514 at a distance that appears at a normal viewing distance to what the user sees. The light projectors 512 may achieve this by displaying only a fraction of the available pixels of the image, such as every other row and column of resolution in the image wherein the resolution displayed matches the original size of the object. Thus, various embodiments may employ optical and/or digital zooming.

It can be appreciated that various embodiments allow for zoomed or magnified objects to be displayed onto the lens 506 or substantially onto the lens 506 without the user 502 having to center his gaze on the object he wants to magnify. A camera 508 may have a swiveling capability to turn towards the object desired to be magnified and then record the image. Alternatively, a fixed, front facing camera 508 can record an image of the entire field of view 504, and then the light projectors 512 can simply display only the magnified portion of the image that the user selects, corresponding to the location of his touch, for example.

Figure 6:
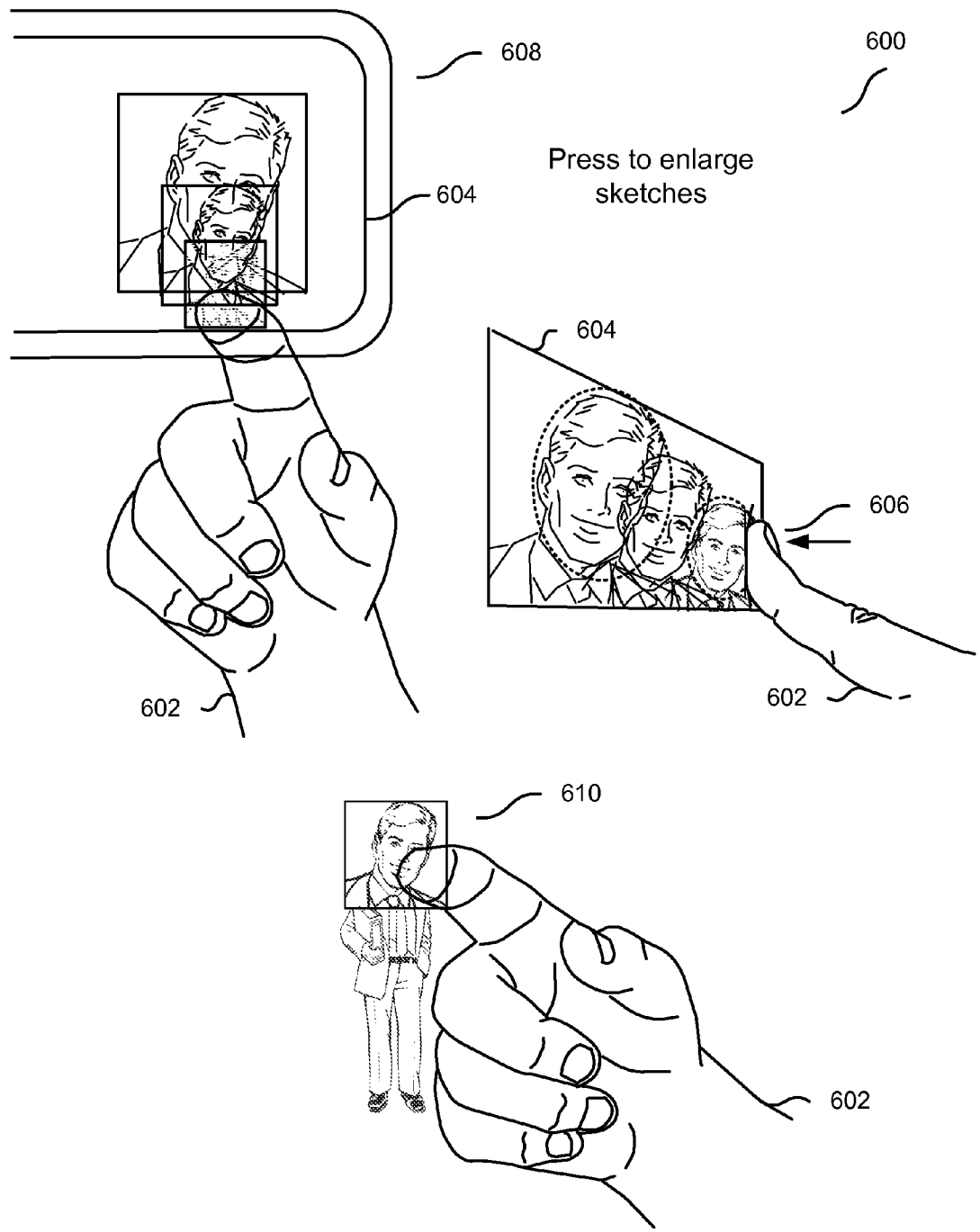
FIG. 6 is a graphical illustration of other various embodiments, including various zooming options.

In some embodiments, a user may be able to signal to the viewing apparatus whether to zoom and to what degree to zoom, based on the amount of pressure applied to the lens. Such is an exemplary feature of various embodiments, as depicted in FIG. 6 at illustration 600. Here, the user 602 may touch the lens 604 at the location corresponding to a man's face along the user's line of sight. The user may be able to enlarge the image of the man's face by applying more pressure to the lens, as shown at 606. The lens 604 may contain pressure sensors that can signal to a camera and/or light projector(s) whether to zoom in on the selection, and to what degree to zoom in. Alternatively, the lens may generate touch data that corresponds to how long the user has been pressing on the lens, and the camera and/or light projectors may provide a zoomed image that corresponds to that length of time.

Illustrations 608 and 610 provide exemplary depictions of what the zoomed images could look like. The man's face could be magnified at multiple degrees, as shown at 608. Illustration 610 provides an example of what a user might see in his field of view, with just a portion of the man being magnified and the rest of his body appearing normal.

Figure 7:
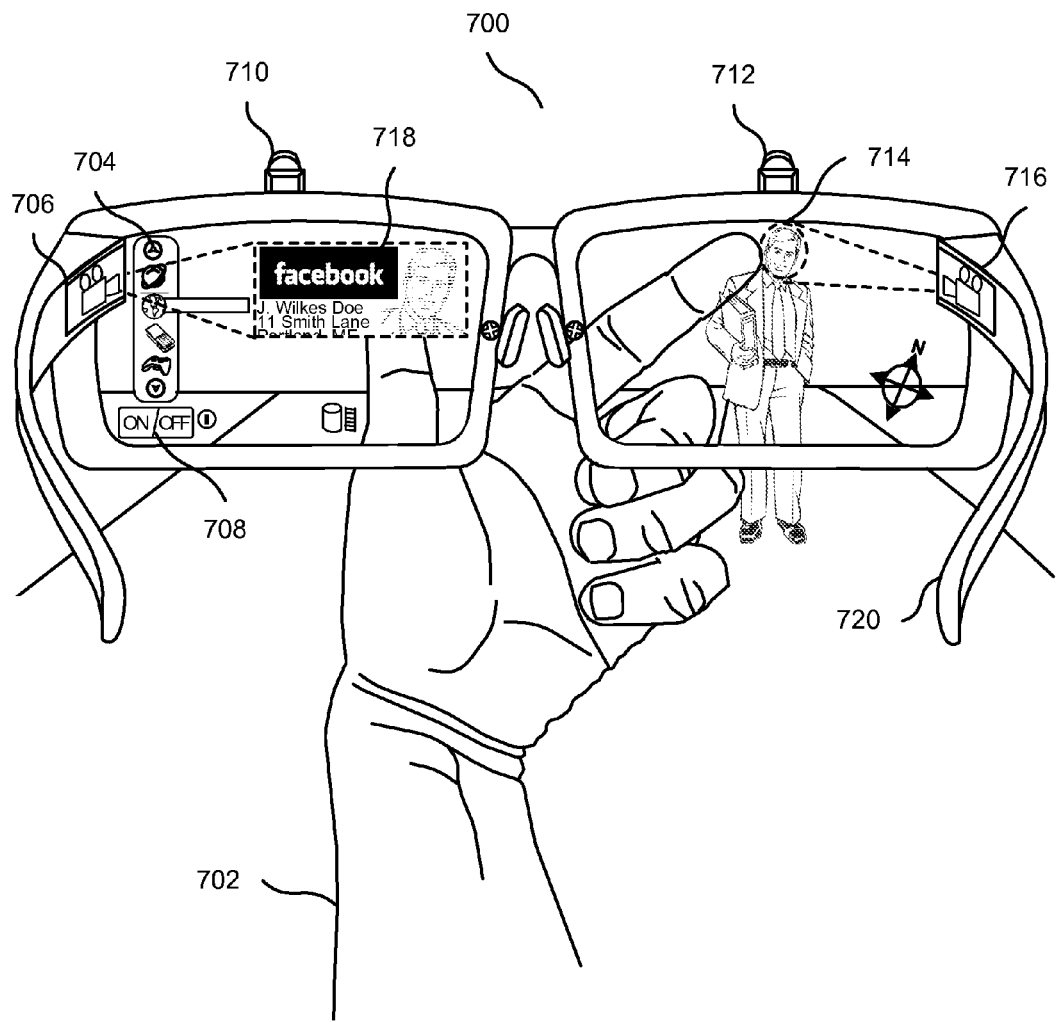
FIG. 7 is a graphical illustration of other various embodiments, including application displays and various augmented reality functions.

Referring to FIG. 7, illustration 700 shows additional functionality of various embodiments, including displayed menus and images onto the user's lens, and highlighted or circled objects within the user's field of view. Here, embodiments show that touching the left and right lens can result in performing different functions. For example, the left lens may have menus and applications 704 projected onto it via the light projector 706. These images may include any number of applications or icons, similar to what might be seen on the desktop screen running an operating system. Touching the left lens may signal to the viewing apparatus 720 to activate or perform operations corresponding to various icons that the user 702 may touch. The user 702 may then touch the bottom left corner area of the left lens where this is an "ON/OFF" icon 708. Touching this area and icon may signal to the viewing apparatus to turn on one or more cameras 710 and 712. The cameras 710 and 712 may be always on, or they may turn off after a prolonged period of non-use, or may be turned off manually, for example in order to conserve power.

After turning on the cameras 710 and 712, the user 702 may touch the location on his right lens that corresponds in his line of sight with a man's face 714 that is within the user's field of view. By touching the right lens, that may signal to the viewing apparatus 720 to perform operations that interact with the user's surroundings, such as selecting and highlighting the object corresponding to the user's touch location. Thus, the camera 712 may record an image and/or start video recording at least the portion of view corresponding to the user's touch. In this case, the camera is instructed to focus on the man's face 714.

Based on the touch data and image recording, the light projector 716 may display a highlight or circle around the selected object according to the location of the user's 702 touch. Thus, it can be seen that each camera and each light projector of embodiments can perform different operations.

After the user 702 has selected the object he wishes to focus on, the user 702 may then touch the left lens corresponding to a location of an application he wishes to utilize. In this case, the user may touch an area of the left lens that corresponds to his social network account. The viewing apparatus 720 may enable the user to look up the selected face 714 in his social network application, and attempt to match the face with images in the social network application in an attempt to identify the selected person. The viewing apparatus 720 may send the recorded image via a built-in wireless connection, not shown, to a remote server for performing this function.

Data may get sent back to the viewing apparatus 720 that enables the light projector 706 to display application data 718 from the user's 702 social network account. The user 702 may then be shown a like image 718 to his selection 714 in the right lens with suggested names of the selected face 714, based on information in the social network application or some other database.

Some embodiments may employ a feature whereby the viewing apparatus 720 registers proximity inputs based on a motion by the user 702 that is substantially close to the lens but not actually touching. The viewing apparatus 720 may have attached multiple cameras, not shown, that can capture the relative locations of a user's motions substantially close to the lenses. Alternatively, the lens may be electrostatically sensitive or may be configured to read heat or infrared (IR) data that corresponds to a location of the user's hand.

The feature described above may signal to some embodiments functionality that differs from functionality based on touching the lens. For example, while touching a lens at a particular location may signal to select an object corresponding to the line of sight and the touch, hovering a finger at that same location may signal to open a menu instead. Other embodiments may be configured to perform the same operation based on either hovering or touching. This may be advantageous where an accidental touch of the lens will not create an inadvertent action, so that touching and near-touching will not be confused.

As previously mentioned, these touch and near-touch or hover actions may constitute generally "proximity inputs." This term as used herein may refer to touch data, near-touch data, hover data, or any combination of such data. Persons having ordinary skill in the art may recognize that proximity inputs therefore may include a vast array of touch data and/or near-touch or hover data associated with a vast array of operations performed by embodiments. Each proximity input may be configured to correspond to any operation described herein, or even similar or analogous operations readily apparent to persons with ordinary skill in the art. The types of operations described herein, corresponding to a type of proximity input, are not limiting on any embodiments and serve merely as examples in this disclosure.

Figure 8:
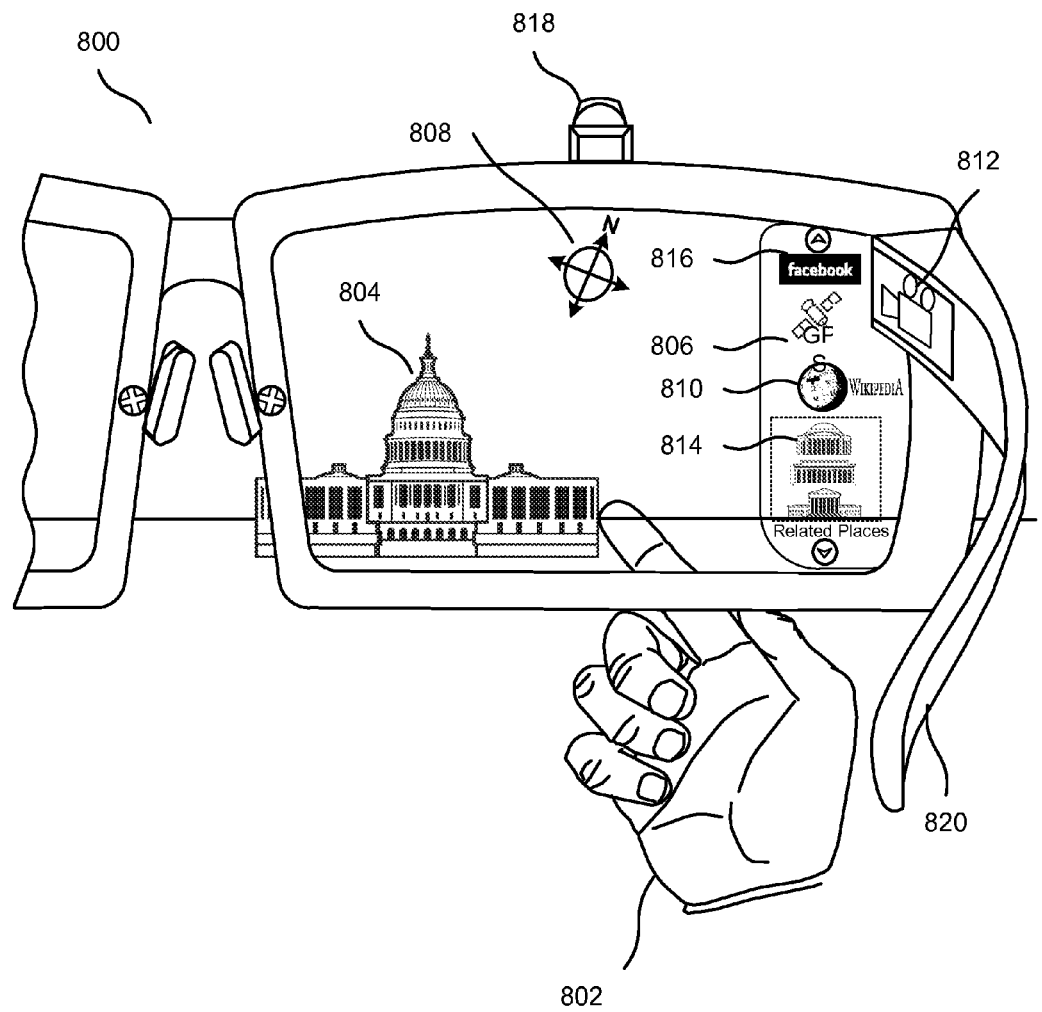
FIG. 8 is a graphical illustration of other various embodiments, including other augmented reality functions.

Referring to FIG. 8, graphical illustration 800 represents other various embodiments. Here, viewing apparatus 820 may be configured to provide information about buildings and notable objects within the user's 802 field of view. For example, the user 802 may be touring the United States Capitol building 804 and be able to see it within his field of view. The user 802 may touch the lens corresponding to the area aligned with his line of sight and with the Capitol 804. Camera 818 may take a picture of the Capitol 804. Then, the image recorded from camera 818 may be recognized not to be a person's face this time, but of a building.

Subsequently, viewing apparatus 820 may utilize a satellite positioning system (SPS) operation 806 that may be one of the applications available in the viewing apparatus 820. For example, the SPS function 806 may comprise a global satellite positioning (GPS) operation and/or a GLONASS operation. The SPS function 806 may activate, after having recognized that a building is selected, in order to determine the user's 802 position. A compass application feature 808 may also be used to determine which direction the user 802 was facing when the image was identified, and based on such information, the viewing apparatus 820 or some remote application may determine that the user 802 has identified the United States Capitol 804.

Viewing apparatus 820 may then have available multiple applications for providing more information about the Capitol 804. An encyclopedic database, such as Wikipedia® 810, could be accessed, and the user may be shown text of information on the lens, displayed via light projector 812. Additionally, another application may cause the light projector 812 to display known related places 814 similar to the Capitol, such as the Lincoln Memorial or the United States Supreme Court building. The user 802 may also choose to capture his iconic moment of standing near the Capitol 804 on his social network account, like Facebook® 816, and upload a picture utilizing that application.

Embodiments may also provide for a "point and click" locking mechanism to identify objects of interest. For example, a user my tap a portion of the viewing apparatus, e.g. the side of the lens or the earpiece of the goggles, which may cause a dot to appear via pico projectors or other projecting element within the field of view of the user. This dot may be activated via an external device as well, e.g. a phone or tablet, through some software application feature. The user may then turn his/her head until a desired object is line with the dot and the user's line of sight. The user may then make another motion, or even the same motion, to capture the image or perform some other related function, e.g. causing the viewing apparatus to provide more information on the object, etc. In some embodiments, the dot remains visible within the field of view of the user until the user breaks contact with the portion of the viewing apparatus, at which time the image is captured or some other related function is performed.

Embodiments may also track from which direction a user's hand enters the field of view, for example as part of a proximity input. For example, embodiments may detect the user's hand/finger entering the field of view from the bottom (i.e. from nose/cheek to eye), which may represent part or whole of an operation, e.g. opening windows that were minimized previously. As another example, embodiments may detect the user's hand/finger entering the field of view from the side (i.e. from the ear toward the center), which may represent part or whole of an operation, e.g. dragging a cursor into the field of view of the lenses.

Embodiments may also perform operations based on combined interactions of both hands of a user. For example, embodiments may be configured for the left lens to track movements from the left hand, and for the right lens to track movements from the right hand, for example using techniques described herein, e.g. capacitive touch screens, IR, ultrasound, etc. A user may use his left thumb and forefinger to make an opening or closing motion in a horizontal motion in front of the left lens. Simultaneously, the user may use his right thumb and forefinger to make an opening or closing motion in a vertical motion in front of the right lens. Such motions may, for example, adjust a box or window, generated by the light pico-projectors onto at least one of the lenses, allowing a user to record a snapshot of the field of view consistent with the size of the box or window. The motions by the two sets of fingers may adjust the box or window in both the horizontal and vertical dimensions, according to an amount of distance between the thumbs and forefingers.

Additionally, the use of both thumbs and forefingers may signal operations to write letters, words, and/or text in some message, e.g. a text message, tweet, Facebook post, etc. Embodiments may detect specific motions and positions of the four appendages (i.e. both thumbs and forefingers) that correspond to each letter of the English alphabet. For example, the user may make an "S" type motion within the field of view to signal the letter "S."

Alternatively, the letters of the alphabet may be first divided into four groups: letters that have circles in them (e.g. "P"), letters with curves (e.g. "S"), letters that have one straight line (e.g. "I"), and letters with at least two straight lines (e.g. "N"). Each of these four groups may be accessed first by the user touching or hovering near a particular region of the viewing apparatus. For example, embodiments may be partitioned into a "lower hover" and "upper hover" zone, for both the left and right lenses. Thus, a user may access each of the four zones with one thumb or forefinger each. The user may then select letters from each of the zones in order to "type" words in messages. In some embodiments, words intended for entry into the message by the user may be determined based on the combination of zones selected by a proximity input of the user, regardless of whether the user individually identifies which of the letters in each zone are being selected. Certainly, such an organization as described is merely illustrative. Other organizations may be implemented and are not so limiting. Furthermore, other languages may be implemented other than English, and embodiments are not so limited.

Similarly, specific areas touched or hovered in or around the lenses may correspond to specific operations, not unlike examples already mentioned in this disclosure. Other examples may include touching or hovering near the inside portion of both lenses (i.e. the portions near the bridge of the nose), which may represent a software reset of the augmented reality system. Again, other examples can be readily devised, and embodiments herein are not so limited.

The descriptions in FIGS. 3-8 are merely examples, to show a possible range of uses and implementations for embodiments of the present invention. It should be apparent to persons having ordinary skill in the art how all of the proposed method steps and operations can be interchanged, substituted, omitted, added to, and/or combined with many other steps and functions similar to the ones described herein, and that the examples described do not limit the invention.

Advantages of embodiments may include interfacing with an augmented reality environment that is more intuitive and user-friendly. In contrast with existing implementations of VR or AR goggles, the touch or near-touch sensitive lenses of various embodiments enable a "hands-free" implementation, where the user does not need to hold an external device in order to interface with the goggles. Furthermore, no dangling wires are necessary in some embodiments, removing such distractions and encumbrances. The touch screen and near-touch features also create a more intuitive interface for a user, enabling a user to simply point at exactly a spot they want to interface with, either for menus projected onto the lenses or objects in the user's field of view. Most importantly, embodiments may yield an aesthetic design that users would not mind wearing out in public and for everyday use, thereby bringing standalone, AR devices to the common consumer.

Figure 9:
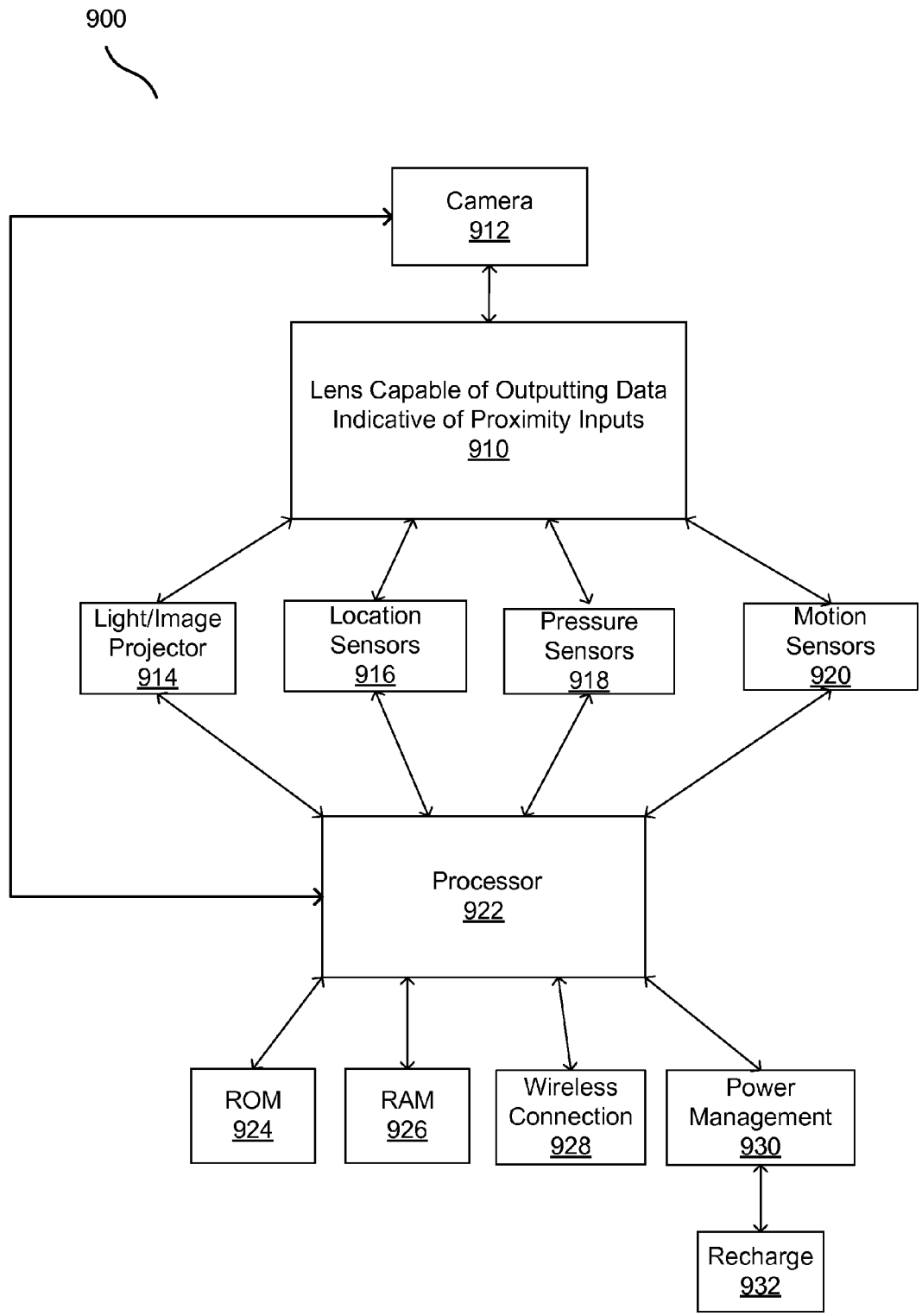
FIG. 9 is a block diagram of components that may comprise various embodiments.

Referring to FIG. 9, a block diagram of a system 900 represents exemplary components and their interconnections in various embodiments. The system 900 includes an element 910 configured to output data indicative of a proximity output. For example, the element 910 may include a touch-sensitive lens. The lens could be a transparent capacitive touch screen, for example, that identifies a user's touch based on human conductivity and can transmit that data through various means to a processor. In other embodiments, a glass lens could be attached to a capacitive film, resistive touch screens, haptics, or capacitive stylus touch screens. Other mediums and combinations that allow for transparent or semi-transparent viewing through the material and maintain touch sensitive capabilities are acceptable, and any particular implementation does not limit the invention. In certain embodiments below, the element 910 is described as a lens. Those of skill in the art will appreciate that these embodiments are merely described as an example, and that other elements may be utilized. Some examples of other elements for detecting and outputting data indicative of a proximity output are described below, for example with respect to detecting near-touch or hover inputs.

In some embodiments, mounted or attached near the lens 910 may be at least one camera 912. Exemplary embodiments may have a front facing camera 912 near the lens 910, such as right above the lens 910, and may be capable of recording a high resolution, panoramic image that represents the entire field of view of a user, or a substantial portion of the entire field of view. In other embodiments, the camera 912 may be capable of swiveling to view different areas. This may be useful for following the locations of a user's touch on the lens 910, so as to be able to record images in the field of view that correspond to the location of the user's touch and the user's line of sight. In some embodiments, the camera 912 possesses a zooming feature that can magnify the recorded image. In some embodiments, the camera 912 may be capable of reducing or increasing the resolution of the recorded image. Although the camera 912 is illustrated separate from the element 910, the camera 912 may be included or otherwise integrated in the element 910.

In some embodiments, mounted or attached near the lens 910 may be a light/image projector 914. The light/image projector 914 may be capable of displaying images onto the lens 910, or reflecting images into the pupils of the user that make it appear as if images are being projected onto the lens 910. Examples may include tiny pico projectors, beam-steering imagers, digital light processing imagers, Light-guide Optical Element (LOE) technology by Lumus, and the like. The light/image projector 914 may receive data input from a processor such as processor 922, to display images into the user's view. The light/image projector 914 may be located near the bridge or nose area of the goggles, toward the side at the corner of the lens 910 and the earpiece, or above or below the lens 910.

In some embodiments, attached to or embedded in the lens 910 may be location sensors 916, pressure sensors 918, and/or motion sensors 920. These sensors may receive and transmit touch data from lens 910 to a processor 922. In some embodiments, touch data can identify the location of a touch on the lens 910, via location sensor 916. This data could be expressed as an (x, y) coordinate on the lens, or some other coordinate system, for example. In some embodiments, touch data can delineate the amount of pressure placed on lens 910 and derive different actions or functions based on that amount of pressure, via pressure sensors 916. The touch data may express the amount of pressure by variable (p), for example. In some embodiments, touch data could be expressed as mere motion near the lens 910, rather than physically touching the lens 910, via motion sensors 920. The motion sensors may comprise additional cameras, heat or infrared (IR) sensors, or the like. These motion sensors may replace or compliment sensors 916 and 918. In some embodiments, an emitter such as a flash or IR emitter is included in the system 900 and may be used in combination with the motion sensors to detect motion.

In some embodiments, any or all of sensors 916, 918, and 920 may be embedded in lens 910 and may be included in a single material, like a substantially transparent capacitive touch screen. In other embodiments, the sensors may be installed separately and overlaid onto the lens 910, or may be installed at another location that may be able to detect inputs near the lens 910, for example in a portion of the frame surrounding the lens 910.

The touch data derived from lens 910 may be ultimately transmitted to processor 922. The touch data may be received and transmitted via the sensors 916, 918 and/or 920, or other means. In other embodiments, data may pass through filters, converters, copiers, repeaters, and other various electronics or systems and may send facsimiles or representations of the touch data to the processor 922. Processor 922 may receive the touch data or information indicative of the touch data, and then performs at least one operation based on said data. For example, the processor 922 may receive touch data indicative of a location on the lens that corresponds to an icon for a compass application. This may signal to the processor 922 to open a compass application. Processor 922 then directs the light/image projector 914 to display a compass graphic, and will continually update the direction the compass should be depending on direction received from processor 922. Processor 922 may access an SPS device that may be built in to the system 900 or accessed remotely via wireless connection 928, thereby continually directing light/image projector 914 what compass direction to display.

In another example, processor 922 may receive pressure data and location data, expressed in a 3-tuple format, e.g. (x1, y1, p1). In response, processor 922 may perform at least one operation according to this combination of data. For example, processor 922 may direct a swivel camera 912 to utilize its zoom feature in accordance with pressure (p1), and record an image corresponding to (x1, y1). This image may then be displayed by light/image projector 914 once processor 922 receives the image data from camera 912. Alternatively, processor 922 may direct a front facing camera 912 to record an image representative of the user's field of view using its maximum resolution, and then may direct light/image projector 914 to display the portion of the image corresponding to the location (x1, y1) with a resolution proportional to the pressure (p1) that reflects either a magnified image or not.

In another example, embodiments may have two lenses, whereby touching each lens may correspond to different functions. Subsequently, processor 922 may receive location data, pressure data, and data indicating which lens was touched. This data may be manifested in a 4-tuple format, e.g. (x2, y2, p2, l), where (l) represents which lens is touched. For example, the user may touch the left lens at location (x2, y2) and with pressure (p2). The left lens 910 may be configured for activating applications only. Thus, this may signal to processor 922 to open an application projected onto left lens 910 at location (x2, y2), and display the operation of the application onto the lens 910 via light/image projector 914. In this case, pressure (p2) may have no function.

The processor 922 may be any suitable type of processor, such as a digital signal processor (DSP), field programmable gate array (FPGA), general microprocessor, or integrated circuit (IC), and is not limited by such examples. The processor 922 may include software, firmware, and/or hardware that can be used to perform the functions described herein. Such software embodiments may include operating systems, device drivers, executable libraries, and/or other code, such as one or more application programs.

In some embodiments, the processor 922 is built into the same apparatus that houses the lens 910, such as a pair of augmented reality goggles. Sensor data, e.g. data from blocks 914, 916, 918 or 920, may be transmitted to the processor 922 via wired connection directly in the same apparatus. Alternatively, data from other sensors or from remote sources could be transmitted to the processor 922. For example, the viewing apparatus may download data, such as SPS measurements, from a larger network or server, after which processor 922 may process the data and use it to perform other operations. In other cases, stored data from a network or server may substitute the sensor data and be analyzed and processed by the processor 922. Such stored data may be used to augment the capabilities of the apparatus, or could be used to calibrate and/or test prototype features of the apparatus.

In other embodiments, processor 922 exists separately from the viewing lens 910. Processor 922 may even exist separately altogether from the viewing apparatus, such that the viewing apparatus acts "passively," merely responding to inputs rather than processing information. For example, a mobile device, such as a phone, may contain the processor 922, which then transmits data, either through wires or wirelessly, to the viewing apparatus, in order to implement the functionality described throughout this disclosure. The sensor data may be first received in the viewing apparatus, but then may be transmitted to the mobile device, and then finally the functionality may be achieved based on the commands of the processor 922. In this way, the viewing apparatus may be a passive device. Similarly, the processor 922 may be located remotely, such as at a larger network or server. The sensor data may be transmitted wirelessly to the remote processor 922, the viewing apparatus of which then receives inputs back and displays the functionality. Tablets, televisions, remote controls, etc. may contain the processor 922, which may then control the viewing apparatus, and embodiments are not so limited.

Coupled to processor 922 may be components like ROM 924, RAM 926, wireless connection 928, and power management system 930. Wireless connection 928 may be any kind of suitable wireless connection, such as a Bluetooth® device, an 802.11 device, a WiFi device, a WiMax device, cellular communication facilities, etc. and/or the like. These may allow processor 922 to perform additional functionality. For example, the memory for processor 922 may be contained in ROM 924. Running applications and recording image data may be contained in RAM 926. Processor 922 may utilize wireless connection 928 to upload data, download data, or access remote applications. Power management system 930 may supply power to processor 922, and may be backed up or supplemented by recharging system 932.

Persons of ordinary skill in the art will readily appreciate that the components, functionalities, and exemplary implementations described in FIG. 9 are merely illustrative and do not so limit embodiments of the invention. Suitable alternatives to any and all descriptions may be readily employed, and combinations, additions, and/or omissions of certain components should be readily apparent and are acceptable.

Figure 10A:
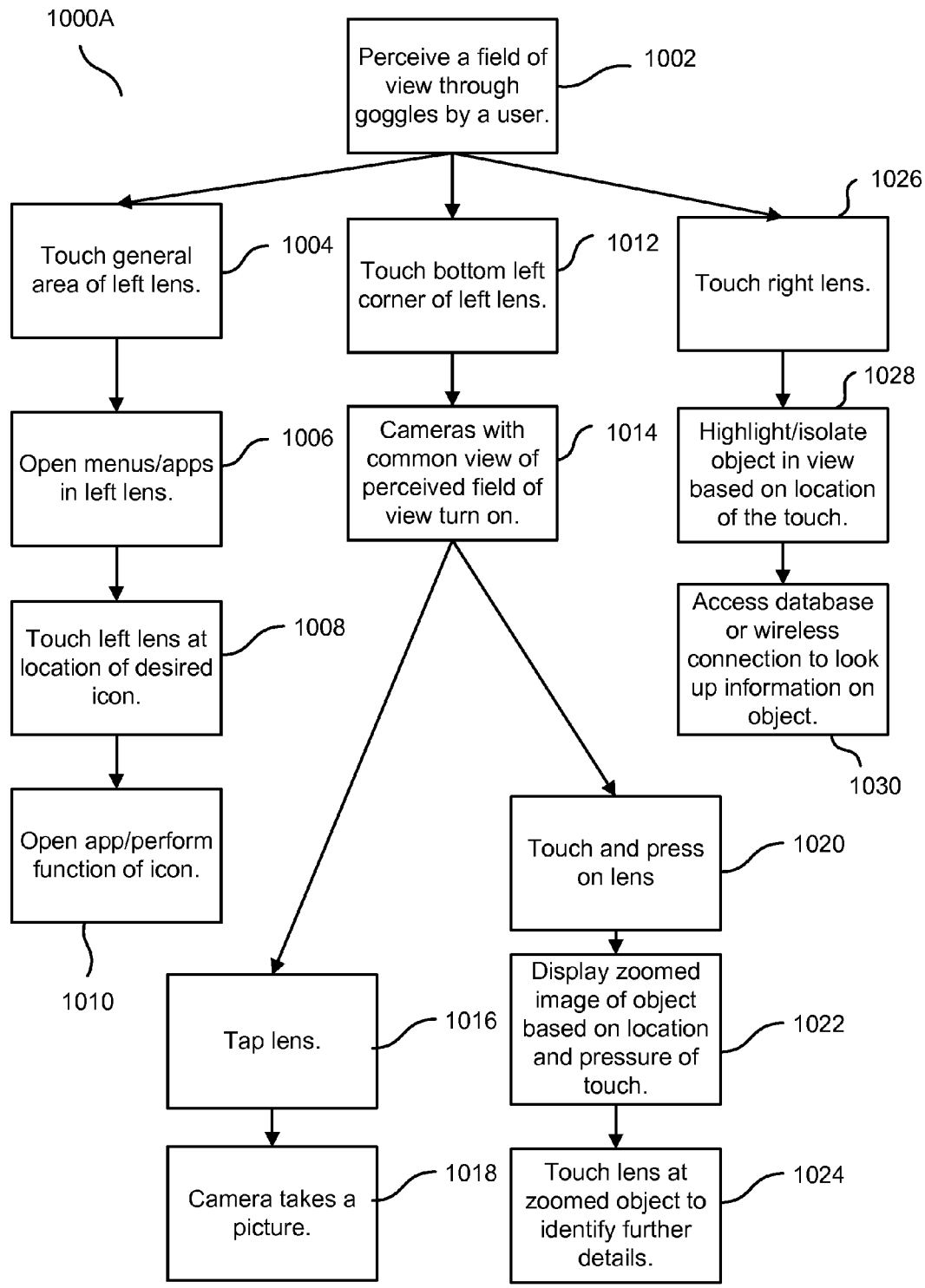
FIG. 10A is a flowchart depicting exemplary method steps of various embodiments.

Referring to FIG. 10A, the block flowchart 1000A represents exemplary method steps that a user can conduct and experience with various embodiments. Starting from block 1002, the user first perceives the field of view through goggles embodying an embodiment of the present invention. The user may then have three options of where to touch on the goggles, relating to three different functions.

One of these options is touching the general area of the left lens at block 1004. In this depiction, such an action results in opening or displaying menus or applications in the view of the left lens, at block 1006. An exemplary display may be what is depicted in FIG. 7, above. The user can then touch on the left lens an area corresponding to the location of one of the applications or icons, at block 1008. This may result in opening an application or performing the function that corresponds to that particular icon, at block 1010. For example, the user may touch an icon that represents accessing their social network account, or opening an application that can read and deposit checks after a picture has been taken of the check. Other examples may be opening a virtual reality game interface that blends graphics on the lens with happenings occurring in the user's surroundings, or opening an application that displays weather information, or SPS/directional information. This list is by no means exhaustive, and persons of ordinary skill in the art would readily understand the many possibilities available to embodiments of this invention.

Another option from block 1002 is for the user to touch the bottom left corner of the left lens, at block 1012. This touch may result in turning on at least one front facing camera, mounted to the goggles, at block 1014. An exemplary embodiment of these elements may be what is depicted in FIGS. 4 and 5, above. From here, the user may have two options on how to utilize the camera features. By tapping the lens, for example, at block 1016, the camera may take a snapshot of the field of view, at block 1018. This may be recorded in memory, or optionally uploaded to some storage via wireless connection, like to a cloud server or the like. The picture could also be displayed in the lens, allowing for superimposing of the picture onto other perspectives of the user's field of view.

Additionally, the user could touch and press, or "hold" position on a location of the lens, at block 1020. This may correspond to activating a zooming feature of the camera, at block 1022, whereby the camera may display a magnified image of the location that the user pressed and "held" on the lens. The degree of pressure applied onto the lens, or the length of time held on the lens, may signal how large a magnification is desired to be displayed in the lens. The camera may perform this function through varies means. For example, the camera may be a high resolution camera, such that at a non-zoomed in distance the camera does not display every pixel or line of resolution. Thus, to create a magnified view, the camera may include more pixels or lines of resolution than normal, and display all of that in the lens, creating a more detailed, zoomed-in effect. Alternatively, the camera may have a swivel and physical zoom feature available, and the camera may physically adjust its field of view corresponding to the location of the user's touch on the lens, zoom in and take a picture of a magnified image. This description is not restrictive, and persons of ordinary skill in the art would understand the many ways to implement these elements of various embodiments of the invention.

Once the magnified image is displayed in the lens, the user is then able to touch a part of the magnified image that the user may not have been able to touch before, at block 1024. This is because the level of precision of the initial touch to an unmagnified image may not have been precise enough. This action may be depicted in FIGS. 5 and 6, for example. For example, the user may see a bird in a tree, or the license plate on a car. The user may want to identify those items, but the user's finger is too large compared to the area taken up by those images in the field of view. Selecting either the bird or license plate may be too difficult without magnifying those areas. Employing features as described herein may enable the bird or license plate to be selected more easily.

A third option starting from block 1002, is for the user to touch the right lens, at block 1026. This may result in actions that interface with the user's field of view and surroundings, at block 1028. Such an action may be depicted in FIGS. 7 and 8, above. For example, the user may touch a location on the right lens where the user's touch aligns with a line of sight that corresponds to a person's face within the user's field of view. This may cause a processor built into the goggles to display a highlight or circle around the face in the lens, and then access a database of images or look up information via wireless connection that corresponds to the selected face, at blocks 1028 and 1030. The processor may employ image recognition to match the face, or may upload a snapshot of the selected image to a cloud-computing server to post-process for more information. Alternatively, the user may touch a location on the right lens that corresponds to a building, or a sign. The processor may employ the same image selection and recognition functions, but for objects, to identify more information about the building or sign.

Persons with ordinary skill in the art will appreciate that the various methods and actions described in FIG. 10A are not exhaustive or restrictive for embodiments of the present invention. It can be readily seen, for example, that actions on the left lens can be interchanged for actions on the right lens, and so forth. Actions described can also be readily combined, or the type of user actions can result in a different type of function. Moreover, the list of actions is by no means exhaustive, and many other operations are possible.

Other touch swipes producing touch data may lead to performing an operation similar or related to those already described, either with one finger, multiple fingers, single lens touches or simultaneous lens touches, in varying directions or multiple directions in a particular pattern, may be possible with at least some embodiments. Many examples may be included and do not limit the invention. For example, a user may perform a zooming feature by "pinching" a lens with a finger and thumb, e.g. by touching a lens with both finger and thumb at different locations, then sliding both thumb and finger to touch together on the lens to perform a shrinking of images or a zooming-out function displayed on the lens. A zooming-in function may be similarly performed by touching a lens with both finger and thumb at substantially the same location, then widening the distance between the thumb and finger in a motion on the lens.

As another example, embodiments may distinguish between a double tap on the lens and a single tap. Embodiments may measure the time in between taps at approximately the same location on a lens, and if the taps occur within a certain threshold, a double tap may be determined. A single tap may represent a selection of a region in the user's field of view; e.g. a dog or the United States Capitol building. A double tap may then represent a selection of a window or menu displayed by the pico-projectors; e.g. a menu to connect to a social network website or to access an SPS function. Of course, the operations performed based on a single tap and double tap as described may be reversed.

As yet another example, embodiments may perceive a single lens finger swipe from the top of the lens down to the bottom to perform yet a different operation. The single lens top/down swipe may minimize all of the windows displayed by the pico-projectors. In some embodiments, a double lens finger swipe from the top down may perform yet a different operation. In this case, all of the windows may be closed instead.

Embodiments may also include performing an operation based on touch data from both lenses received sequentially in time. For example, swiping a finger across both lenses from left to right, or right to left, may increase the brightness of the images being projected. Such an operation may be useful to adjust for indoor or outdoor lighting, or lack thereof.

Figure 10B:
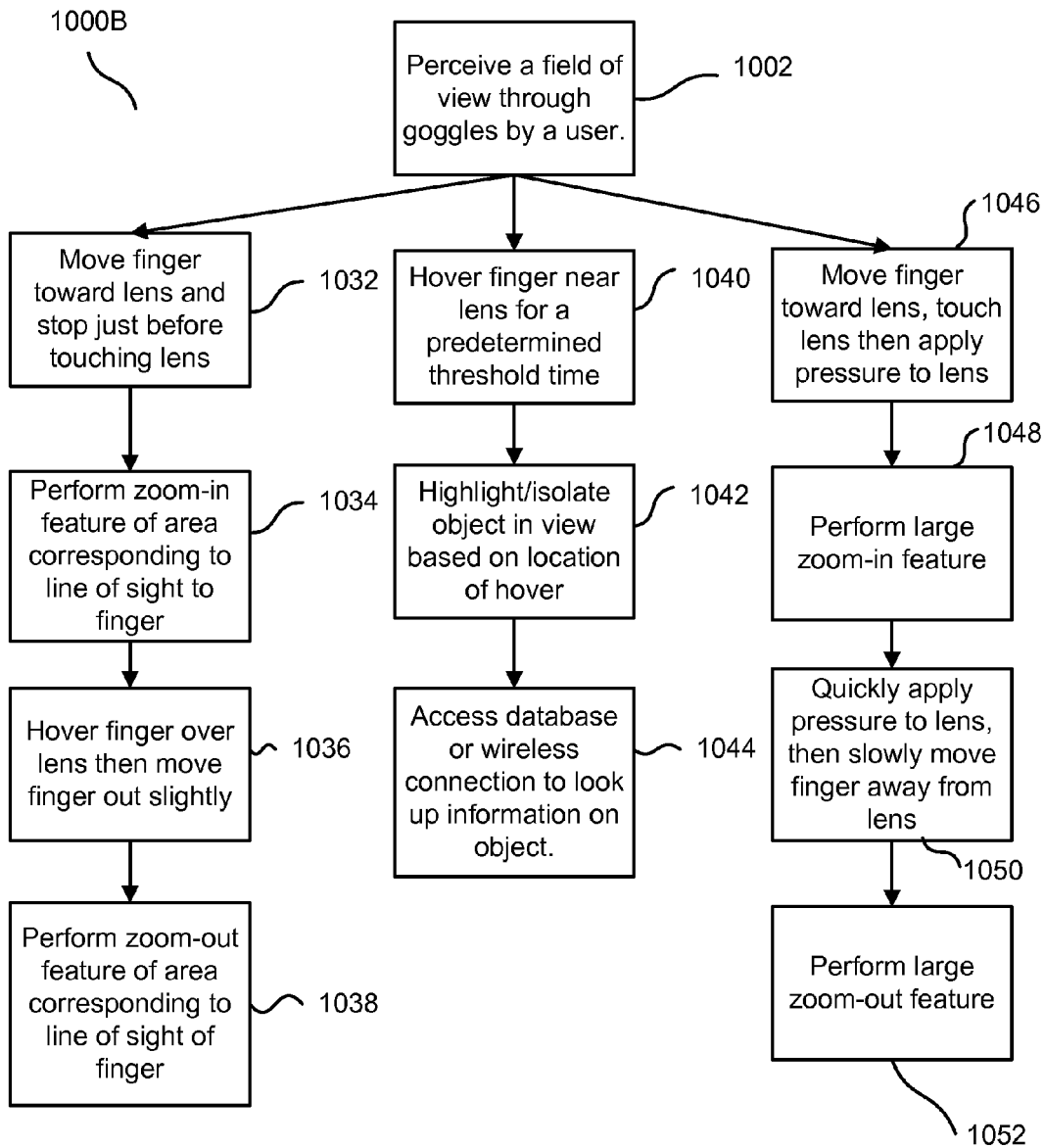
FIG. 10B is a flowchart depicting further exemplary method steps of various embodiments.

Referring to FIG. 10B, embodiments may also include hover or near-touch features that may be detected as proximity inputs, in addition to or in place of touch features. The flowchart 1000B lists just a few exemplary actions to demonstrate proximity inputs, but more actions, corresponding to other operations performed by various embodiments, may be readily apparent to those of ordinary skill in the art and may be included in embodiments of the present invention.

Starting again to block 1002, a user first perceives a field of view through goggles, or other variations of a viewing apparatus. At block 1032, the user may move his finger, starting away from a lens but still within the field of view, towards the lens and stopping just before touching the lens. In some embodiments, this motion may be determined to be a proximity input. In such embodiments, the proximity input may thus be determined by a change and/or cessation of velocity of the finger. In some embodiments, for example as illustrated at block 1034, this proximity input may signal a zoom-in feature, being likened to the user's finger getting larger within the user's field of view.

Pico projectors positioned to view motions from the sides of the viewing apparatus may be configured to sense the motion of the user's finger. Alternatively, cameras placed on the front of the apparatus in a "stereo" fashion may be configured to detect movements in perspective, such that the viewing apparatus can detect when a finger may be moving closer or farther away from the viewing apparatus. Further, a time of flight camera or another type of depth camera may be used to detect movements. Camera(s) 408, 508, 710, 712, and/or 818 may be configured to capture images of the user's field of view and to detect movements of the user in some embodiments. In other embodiments, different cameras may be used to capture images of the user's field of view and to detect movements of the user. Alternatively, heat sensors, infrared (IR) cameras, or electrostatic sensors may be configured to detect a finger and it's approximate distance away from a lens. Multiple sensors may be present, and may be arranged in multiple fashions, such as sensors arranged around the entire frame of VR goggles or just partially. Similarly, a single emitter such as an IR emitter may be included or a series of emitters may be included. In one embodiment, the series of emitters may surround the frame of the VR goggles or a portion thereof.

Other elements for detecting a hover or near-touch input may include ultrasound devices. For example, a user may wear sensors on fingers that are sensitive to ultrasound, or may wear a device or use a wand that emits ultrasound, which may be received by a plurality of microphones on the frame of the VR goggles. Sensors on fingers may be sensitive to other devices readily apparent to those with ordinary skill in the art, such as proximity sensor devices or optics devices. Sensors embedded within the viewing apparatus may be configured to detect locations of sensors placed on fingers, such that their measured distance can be measured to determine that a finger is conducting a hover action. Further, proximity sensors and/or light sensors may be disposed in the frame to detect when a finger is near, or to detect certain movements of a hand or finger, for example a swipe from one edge of the frame to another. In some embodiments, the proximity detectors comprise capacitive and/or electric field proximity sensors. Any or all of these examples of devices that may be used to detect hover, near-touch, or other proximity inputs may be used alone or in combination with any other of these examples, including others readily apparent to those with ordinary skill in the art.

Referring now to block 1036, a user may hold a finger near a lens for a brief period of time, then move the finger out slightly. At block 1038, this motion may correspond to performing a zoom-out feature of a viewing area corresponding to a line of sight of the finger. It should be apparent that blocks 1032 and 1036 do not have to be performed in sequence according to the arrows shown.

At block 1040, a user may hold a finger near a lens for a predetermined threshold time, e.g. 0.25 or 0.5 seconds, at which time this action is detected as a hover. In some embodiments, the hover is detected when the finger is held within a threshold distance to the lens, e.g. within 1 cm. This distance, however, is merely exemplary. At block 1042, based on the finger held near the lens for the predetermined threshold time, embodiments may determine that the user is performing an action, and in this case embodiments may perform a highlight or isolation of an object within the field of view, based on the location of the hover. Notice this operation may be substantially similar to the operation described in block 1028, corresponding to a touch on the right lens by the user at block 1026. Among other things, this example shows that some touch operations may correspond to substantially similar near-touch or hover operations in embodiments. Indeed, at block 1044, the hover action of block 1040 further corresponds to accessing a database or wireless connection to look up information on the selected or highlighted object. Block 1044 therefore substantially corresponds to block 1030.

At block 1046, a user may combine both a touch and near-touch action that signals to some embodiments one operation. Here, the user may move a finger toward the lens, then touch the lens, then apply pressure to the lens. At block 1048, according to some embodiments, this entire sequence of actions by the user may correspond to a single operation, such as performing a large zoom-in of an area of the field of view that is more magnified than the zoom-in feature described at block 1034. Notice that this operation corresponds to a combination of near-touch data (e.g. move finger toward lens) and touch data (e.g. touch lens then apply pressure). Other types of proximity inputs involving a combination of near-touch data and touch data are certainly possible. Embodiments may employ any and all types of proximity inputs as described or suggested, and are not so limited.

At block 1050, the user may conduct certain actions to achieve the opposite operation. Here, the user may quickly apply pressure to the lens, then slowly and methodically move the finger away from the lens, essentially in reverse order of block 1046. At block 1052, this may correspond to performing a large zoom-out feature. A distance of the finger from the lens may determine the magnitude of the zoom in some embodiments. Thus, the user may control how much zoom is effected by slowly pulling the finger away and/or slowly returning the finger toward the lens.

Embodiments may also be configured to measure the rate, or velocity, of a finger in order to determine a proximity input. For example, a slow moving finger toward the lens may cause the viewing apparatus to perform a zoom-in feature, while a quick movement of a finger toward the lens may cause the viewing apparatus to close or minimize all open icons appearing on the lens.

Embodiments may also distinguish operations based on varying distances of a hover from the lens. For example, if a user places a finger 0.1 cm away from the lens, this may signal an operation to select an icon in a menu on the lens, whereas a user placing a finger 1 cm away from the lens may signal an operation to select an object within the field of view. In one embodiment, the proximity of a user's hand completely occluding a lens may be used to determine how much the lens is darkened, for example to provide a form of virtual transition lenses.

Embodiments may also be configured to distinguish between a finger or other object intended to be used to induce operations via proximity inputs (e.g. stylus, pointer, sensor designed to detect hover, etc.), and all other objects that may appear in front of lenses or touch lenses, but not be intended to provide a proximity input. For example, a user's hair falling in front of a lens should typically be ignored as not qualifying as a proximity input. A processor associated with embodiments, such as processor 922, may be programmed or trained to distinguish between such objects, e.g. using trained models or visualization techniques. Alternatively, a finger or other object may contain certain distinguishable properties, like temperature or having sensors on the finger or object, enabling embodiments to distinguish correctly when keyed to these properties. For example, capacitive or electric field proximity sensors may be configured to distinguish a human object (for example, a finger) from other objects (for example, a leaf that may blow by or touch the lens). In some embodiments, only inputs from fingers are accepted. Various means of distinguishing between an object intended to provide a proximity input and not may be used, and embodiments are not so limited as to what technique(s) may be used. For example, methods described in U.S. Pat. No. 7,853,041 for determining whether an object comprises a finger may be included. Other methods may include discounting touches that resemble accidental contact with the lens (for example, light or continuous contact that may represent hair brushing the lens), or that do not last for a threshold amount of time or are not detected as being performed with a threshold amount of pressure. This application expressly incorporates by reference U.S. Pat. No. 7,853,041, filed Jan. 6, 2006, and titled "Detecting and Tracking Objects in Images," in its entirety and for all purposes. Where a definition or use of a term in that patent is inconsistent or contrary to the definition of the term provided herein, the definition of the term provided herein applies and the definition of the term in that patent does not apply.

The hand motions described herein may cause embodiments to perform other operations similarly described or otherwise readily ascertainable to those with ordinary skill in the art. Additional types of proximity inputs may also be receivable by embodiments of the invention and are not limited to just those described herein. In general, it should be understood that embodiments may perform a vast array of operations, based on proximity inputs from a vast array of gestures on either a single lens or double lens. Gestures may include a touch, tap, hover, etc. as described above, as well as gestures such as a circle motion or swipe. In some embodiments, a user may circle an object of interest within his field of view using his finger in order to select the object or enter information about the object.

Figure 11:
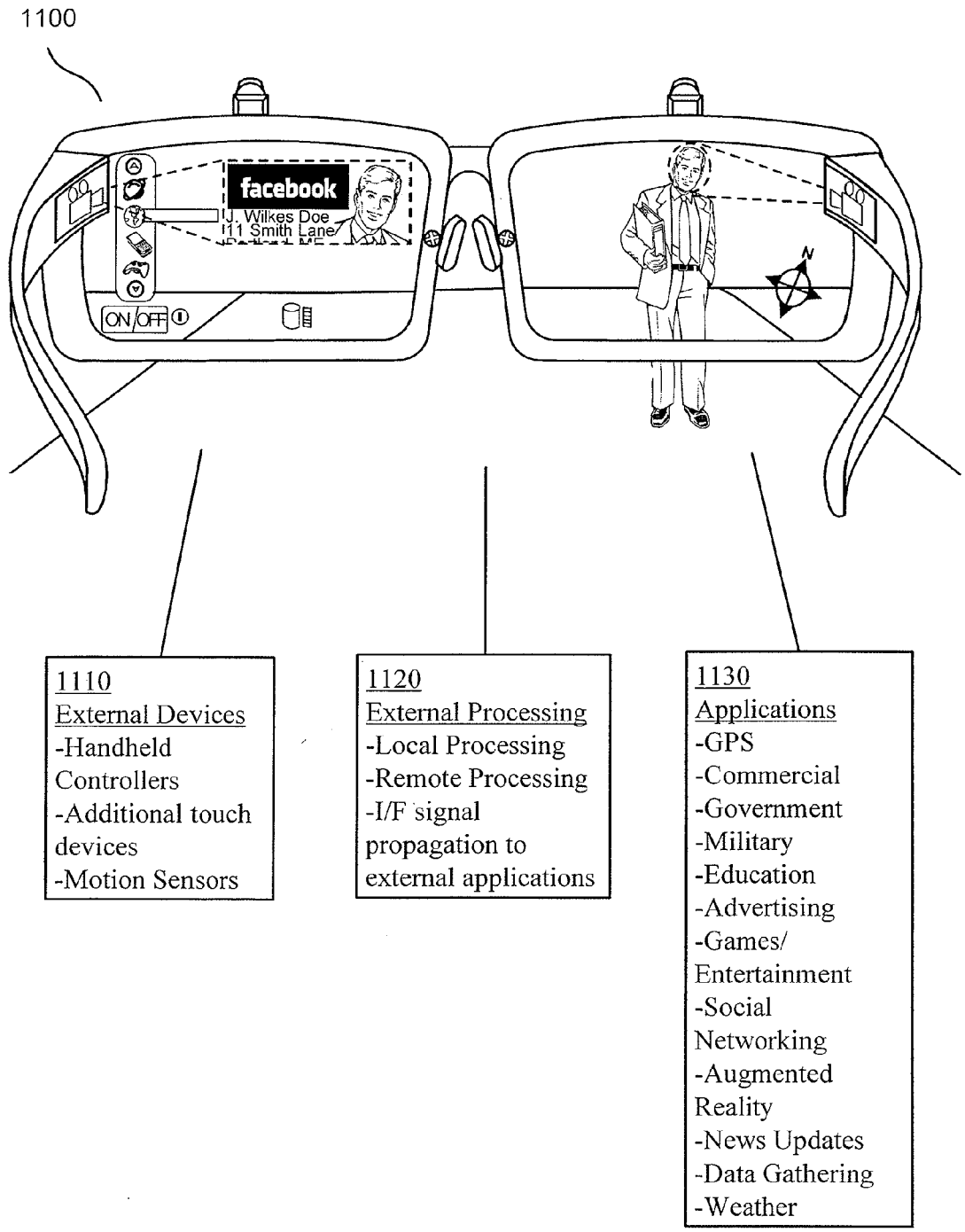
FIG. 11 is a tabular listing of various functions and accessories that may attach to or be included in various embodiments.

Referring to FIG. 11, block diagram 1100 lists various functions and accessories that may attach to or be included in various embodiments. For example at block 1110, while not necessary, external devices can still attach to embodiments, such as handheld controllers, multiple touch devices, or sensors that track a user's motion. Additionally, data received or created by goggles embodying examples of the invention can be processed external to the goggles, at block 1120. A processor in a research lab, for example, can attach to the goggles and enable more powerful local processing. Alternatively, a wireless connection may enable data to be processed remotely. The data could even be converted to an intermediate frequency (I/F) signal and propagated to a radio receiver or the like for additional processing.

Furthermore, it should be apparent to persons with ordinary skill in the art that various embodiments of the present invention can encompass myriad uses and applications, shown in block 1130 for example. Uses and applications may include, and are not limited to, SPS tracking, commercial, government, military, educational, and advertising uses, games and entertainment, video, streaming, social networking, augmented reality, ticker and news updates, data gathering and research, and weather information. These lists described in FIG. 11 are by no means exhaustive, and can include any and all variations and combinations apparent to those with ordinary skill in the art.

Many embodiments may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the processor 922) to perform methods in accordance with the disclosure. For example, some or all of the procedures of the described methods may be performed by the viewing apparatus in response to the processor executing one or more sequences of one or more instructions (which might be incorporated into an operating system and/or other code, such as an application program) contained in working memory. Such instructions may be read into the working memory from another computer-readable medium, such as one or more of the storage device(s). Merely by way of example, execution of the sequences of instructions contained in the working memory might cause the processor(s) to perform one or more procedures of the methods described herein, for example a method illustrated and/or described with respect to FIGS. 10A & 10B.

Again, embodiments employing computer systems described herein are not limited to being physically connected to the viewing apparatus. Processing may occur in another apparatus, connected via wire or wirelessly to the viewing apparatus. For example, a processor in a phone or instructions for executing commands by a phone or tablet may be included in these descriptions. Similarly, a network in a remote location may house a processor and send data to the viewing apparatus.

The terms "machine-readable medium" and "computer-readable medium," as used herein, refer to any medium that participates in providing data that causes a machine to operate in a specific fashion. In an embodiment implemented using the processor 922, various computer-readable media might be involved in providing instructions/code to processor(s) 922 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory, such as flash memory or DDR3 RAM. Transmission media include, without limitation, coaxial cables, copper wire and fiber optics, as well as the various components of a communications subsystem (and/or the media by which the communications subsystem provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A viewing apparatus for a user comprising:
at least one lens through which the user can visually perceive a field of view; and
a processor configured to:
receive first data indicative of a first proximity input within a first region with respect to the at least one lens, wherein the first proximity input is indicative of a location of a first touch by the user on the at least one lens;
perform a first operation in response to the received first data;
receive second data indicative of a second proximity input within a second region with respect to the at least one lens, wherein the second proximity input is indicative of a location of a second touch by the user on the at least one lens;
select an object within the field of view corresponding to the first data, wherein the object and the location of the first touch on the at least one lens are on a common line of sight of the user; and
perform a second operation pertaining to the object in response to the received second data, wherein the second operation is an operation from one or more operations presented in response to the received first data.

2. The viewing apparatus of claim 1, further comprising:
at least one camera configured to record at least one image representative of the field of view; and
the processor, further configured to:
receive the at least one image,
identify a location on the at least one image that is mapped to the location of the first touch on the at least one lens, and
wherein the selection of the object within the field of view further corresponds to the location on the at least one image.

3. The viewing apparatus of claim 2, wherein:
the at least one camera is each further configured to perform a zooming function that magnifies a viewing location within the field of view based at least in part on a gesture performed by the user.

4. The viewing apparatus of claim 2, wherein the at least one image is recorded in response to the reception of the first data by the processor.

5. The viewing apparatus of claim 1, further comprising:
an image projection module configured to project visual information on the at least one lens, wherein the visual information is based on information about the selected object; and
the processor, further configured to:
instruct the image projection module to display the visual information on the at least one lens.

6. The viewing apparatus in claim 5, wherein:
the at least one lens is one of two lenses; and
the processor is further configured to:
detect which lens is touched, and
instruct the image projection module to display the visual information, wherein the visual information is based further on which lens is touched.

7. The viewing apparatus in claim 5, wherein:
the at least one lens is further configured to output the first or second data to the processor, the first or second data being further indicative of an amount of pressure of the first or second touch by the user on the at least one lens; and
the processor is further configured to:
instruct the image projection module to display the visual information, wherein the visual information is based further on the amount of pressure of the first or second touch.

8. The viewing apparatus of claim 1, wherein the one or more operations comprise transmitting information to another device.

9. The viewing apparatus of claim 1, wherein the one or more operations comprise displaying information related to an object or individual proximate to the user.

10. The viewing apparatus of claim 9, further comprising a Satellite Positioning System (SPS) unit, wherein the object or individual proximate to the user is determined based at least in part on input received from the SPS unit.

11. The viewing apparatus of claim 9, further comprising a camera configured to capture an image of at least a portion of the field of view, wherein the object or individual proximate to the user is determined by identifying the object or individual in the captured image.

12. The viewing apparatus of claim 1, wherein the at least one lens is touch sensitive and is configured to output the first or second data when a user touches the at least one lens.

13. The viewing apparatus of claim 1, wherein the first or second proximity input comprises an object hovering near the at least one lens.

14. The viewing apparatus of claim 13, further comprising at least one camera configured to capture an image of the object, wherein the first data received by the processor comprises information based on the image, and wherein the processor is further configured to identify when an input has occurred based on the received first data.

15. The viewing apparatus of claim 14, wherein the at least one camera is further configured to use infrared (IR) data to detect position or depth of the object.

16. The viewing apparatus of claim 14, wherein the at least one camera is two cameras, configured to provide a stereo image of the object.

17. The viewing apparatus of claim 14, wherein the at least one camera is further configured to capture an image of at least a portion of the field of view.

18. The viewing apparatus of claim 1, wherein the first touch and second touch by the user occur in a sequence in time.

19. A method for use with a viewing apparatus, comprising:
   receiving first data indicative of a first proximity input performed within a first region with respect to at least one lens of the viewing apparatus, a field of view being observable through the at least one lens by a user of the viewing apparatus, wherein the first proximity input includes a location of a first touch by the user on the at least one lens;
   performing a first operation in response to the received first data;
   receiving second data indicative of a second proximity input performed within a second region with respect to the at least one lens of the viewing apparatus, wherein the second proximity input includes a location of a second touch by the user on the at least one lens;
   selecting an object within the field of view corresponding to the first data, wherein the object and the location of the first touch on the at least one lens are on a common line of sight of the user; and
   performing a second operation pertaining to the object in response to the received second data, wherein the second operation is an operation from one or more operations presented in response to the received first data.

20. The method of claim 19, wherein the first touch further causes:
   at least one camera to record at least one image representative of the field of view; and
   the processor to:
      receive the at least one image,
      identify a location on the at least one image that is mapped to the location of the first touch on the at least one lens, and
      wherein the selection of the object within the field of view further corresponds to the location on the at least one image.

21. The method of claim 20, wherein:
   the at least one camera is each further configured to perform a zooming function that magnifies a viewing location within the field of view based at least in part on a gesture performed by the user.

22. The method of claim 20, wherein the at least one image is recorded in response to the reception of the first data.

23. The method of claim 19, wherein the first touch further causes:
   an image projection module to project visual information on the at least one lens, wherein the visual information is based on information about the selected object; and
   the processor to instruct the image projection module to display the visual information on the at least one lens.

24. The method of claim 23, wherein:
   the at least one lens comprises two lenses; and
   the first or second touch by the user on the at least one lens comprises a first or second touch by the user on one of the two lenses, wherein the method further comprises:
      detecting which lens is touched, and
      instructing the image projection module to display the visual information, wherein the visual information is based further on which lens is touched.

25. The method of claim 23, wherein the first or second touch further causes:
the at least one lens to output the first or second data, the first or second data being indicative of an amount of pressure of the touch by the user on the at least one lens; and
   the processor to instruct the image projection module to display the visual information, wherein the visual information is based further on the amount of pressure of the first or second touch.

26. The method of claim 19, wherein the one or more operations comprise transmitting information to another device.

27. The method of claim 19, wherein the one or more operations comprise displaying information related to an object or individual proximate to the user.

28. The method of claim 27, further comprising determining the object or individual proximate to the user based at least in part on input received from a Satellite Positioning System (SPS) unit.

29. The method of claim 27, further comprising capturing an image of at least a portion of the field of view, wherein the object or individual proximate to the user is determined by identifying the object or individual in the captured image.

30. The method of claim 19, wherein the first or second proximity input comprises an object hovering near the at least one lens.

31. The method of claim 30, further comprising at least one camera detecting the object hovering near the at least one lens.

32. The method of claim 30, further comprising determining that an object moving within a threshold distance to the at least one lens comprises the first or second proximity input.

33. The method of claim 19, wherein the first or second proximity input comprises both at least one touch on the at least one lens and an object hovering near the at least one lens.

34. The method of claim 19, wherein the first touch and second touch by the user occur in a sequence in time.

35. A viewing apparatus for a user comprising:
   at least one viewing means through which the user can visually perceive a field of view; and
   means for receiving first data indicative of a first proximity input within a first region with respect to the at least one lens, wherein the first proximity input is indicative of a location of a touch by the user on the at least one lens;
   means for performing a first operation in response to the received first data;
   means for receiving second data indicative of a second proximity input within a second region with respect to the at least one lens, wherein the second proximity input is indicative of a second location of a touch by the user on the at least one lens;
   means for selecting an object within the field of view corresponding to the first data, wherein the object and the location of the touch on the at least one lens are on a common line of sight of the user; and
   means for performing a second operation pertaining to the object in response to the received second data, wherein the second operation is an operation from one or more operations presented in response to the received first data.

36. The viewing apparatus of claim 35, further comprising:
   recording means to record at least one image representative of the field of view;
   means for receiving the at least one image;
   means for identifying a location on the at least one image that is mapped to the location of the first touch on the at least one viewing means, and wherein the means for selecting the object within the field of view further corresponds to the location of the first touch on the at least one viewing means.

37. A computer program product residing on a non-transitory processor-readable medium and comprising processor-readable instructions configured to cause a processor to:
receive first data indicative of a first proximity input within a first region with respect to at least one lens through which a user can visually perceive a field of view, wherein the first proximity input is indicative of a first location of a touch by the user on the at least one lens;
perform a first operation in response to the received first data;
receive second data indicative of a second proximity input within a second region with respect to the at least one lens, wherein the second proximity input is indicative of a second location of a touch by the user on the at least one lens
select an object within the field of view corresponding to the first data, wherein the object and the location of the touch on the at least one lens are on a common line of sight of the user; and
perform a second operation pertaining to the object in response to the received second data, wherein the second operation is an operation from one or more operations presented in response to the received first data.

38. The computer program product of claim 37, wherein the processor-readable instructions further cause the processor to:
receive at least one image from at least one camera configured to record the at least one image representative of the field of view; and,
identify a location on the at least one image that is mapped to the location of the first touch on the at least one lens, and
wherein the selection of the object within the field of view further corresponds to the location on the at least one image.

39. The computer program product of claim 37, wherein the processor-readable instructions further cause the processor to:
instruct an image projection module to display visual information on the at least one lens;
wherein the image projection module is configured to project the visual information on the at least one lens; and
wherein the visual information is based on information about the selected object.

* * * * *